March 26, 1974   H. A. HANCOCK   3,799,808

PROCESS FOR MAKING POROUS ELECTRODE PLATES

Filed Oct. 7, 1971

INVENTOR.
HERBERT A. HANCOCK

BY
Agent

# United States Patent Office 3,799,808
Patented Mar. 26, 1974

3,799,808
**PROCESS FOR MAKING POROUS
ELECTRODE PLATES**
Herbert A. Hancock, Dartmouth, Nova Scotia, Canada, assignor to Sherritt Gordon Mines Limited, Toronto, Ontario, Canada
Filed Oct. 7, 1971, Ser. No. 187,380
Claims priority, application Canada, Nov. 5, 1970, 97,434
Int. Cl. H01m 43/04
U.S. Cl. 136—29      2 Claims

ABSTRACT OF THE DISCLOSURE

An elongated, self-supporting porous metal plate is produced by a process of applying a layer of slurry of nickel powder volatile liquid and organic binder to a flexible carrier strip which is capable of being decomposed at sintering temperature and then drying, coining, and sintering the layer of slurry and decomposing the carrier.

The present invention relates to the production of porous metal plates from metal powders and is particularly directed to the production of porous nickel electrodes for electrochemical devices.

Porous plates for battery electrodes conventionally consist of at least one layer of porous metal. Normally, the porous metal is in the form of partially compacted metal particles and with some metals it is feasible to sinter the particles to form self-supporting plates. In the conventional sintered plate, however, it is necessary also to incorporate a supporting structure or grid in the form of solid metal strip bars or wires to improve the strength and electrical conductivity of the plates.

This grid adds materially to the raw material and manufacturing costs of the plates, yet does not participate appreciably in the electrochemical reaction. In addition, the thickness of the plate is greater and the flexibility may be less than plates which do not include a support grid. Thus, the plates are more bulky and less adaptable to use in batteries of various shapes than gridless plates.

It is accordingly an object of this invention to fabricate self-supporting, metal plates for electrochemical devices which do not have these shortcomings.

It is a further object to fabricate elongated strips of self-supporting porous nickel plates.

It is a further object to provide a method of forming electrode plates which is adaptable to mass production, quick start-up and rapid changeover.

According to the present invention, an elongated, self-supporting porous metal plate is produced by a process of applying a layer of slurry of nickel powder, volatile liquid and organic binder to a flexible carrier strip which is capable of being decomposed at sintering temperatures and then drying, coining, and sintering the layer of slurry and decomposing the carrier.

Figure 1:
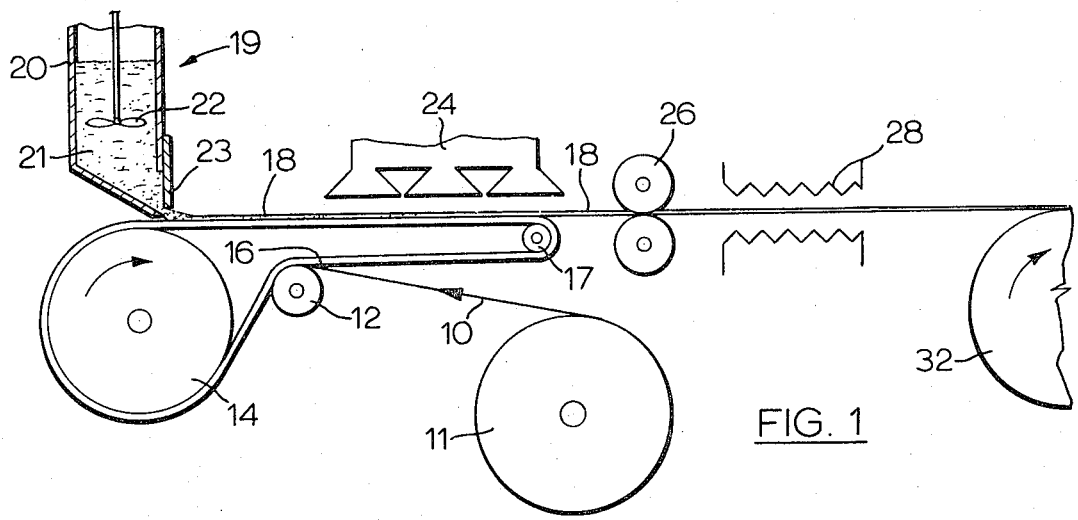
Figure 2:
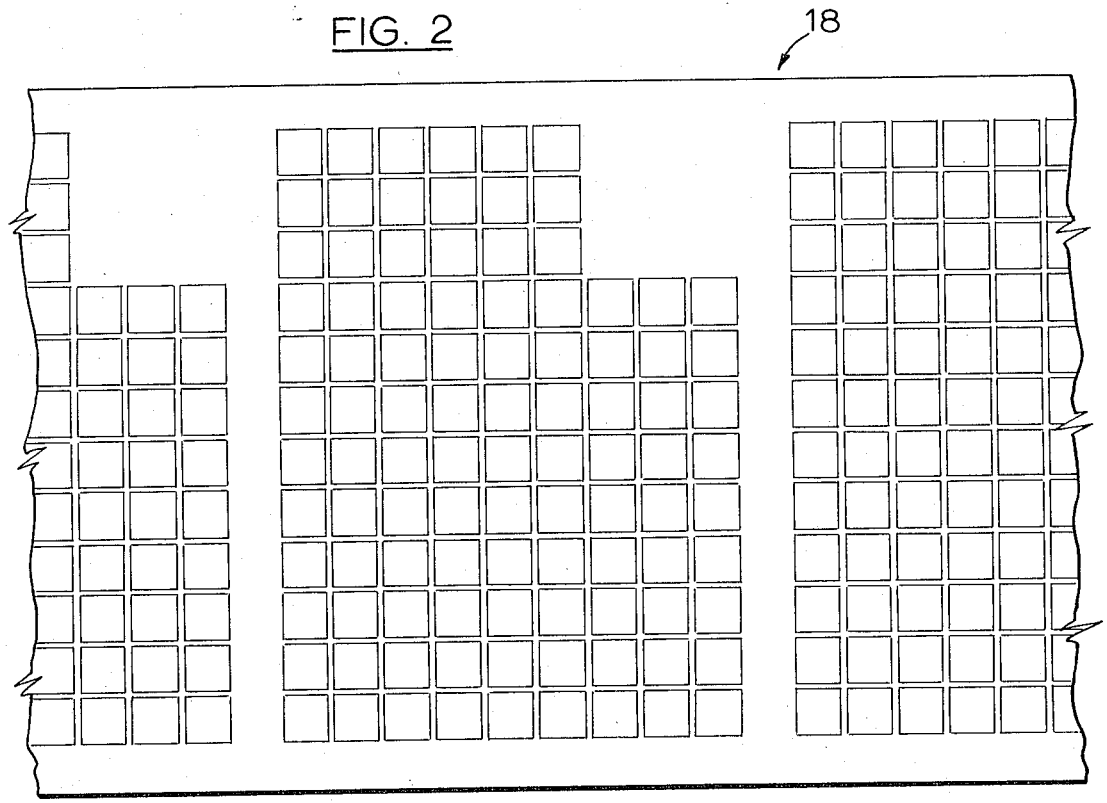

A fuller understanding of the invention may be had by referring to the following description and claims taken in conjunction with the accompanying drawings in which:

FIG. 1 is a diagrammatic illustration of an apparatus for the fabrication of porous plates according to the invention; and FIG. 2 is a plan view of a strip of contiguous porous plates produced in accordance with the invention.

Referring to the drawing, FIG. 1 illustrates a system for forming a series of porous plates according to this invention. A carrier 10 in the form of a long strip is carried from storage drum 11 on rollers 12 and 14 into engagement with a flexible but strong and heat resistant support belt 15 which passes around rollers 14 and 17. A layer of metal powder slurry, indicated by the numeral 18, is deposited on the upper face of carrier 10 by dispensing means 19 which includes a container 20 for metal powder slurry 21 and agitator 22 and metering gate 23. Belt 16 preferably is provided with sharp projections, not shown, which serve to secure the carrier 10 thereto so that carrier will resist wrinkling when the slurry layer 12 shrinks upon drying.

Slurry layer 18 on carrier 10 passes through drier 24 in which the liquid fraction of the slurry is removed by evaporation. Carrier 10 and the now dry layer 18 next passes between coining rollers 26 and into sintering furnace 28 where carrier 10 is burned off or decomposed. Finally, after exiting from sintering furnace 28, the layer 20 which is now self-supporting, is wound onto spool storage 32.

Carrier 10 is a thin elongated flexible strip of material which is unreactive with slurry 21 and decomposable at the sintering temperature of the metal powder. Films produced from wood pulp by the viscose process, for example, cellophane, are particularly suitable.

Slurry 21 is comprised of metal powder such as nickel powder, volatile liquid and an organic binder. The viscosity of the slurry must be controlled to ensure that the metal powder remains in suspension. In most cases, the most suitable and the least expensive slurry make-up liquid is water.

It is well known that plates suitable for battery electrodes should have a high porosity. Metal powder having an irregular particle shape, low bulk density and low shrinkage on sintering generally result in high porosity sintered plates. Various kinds of metal powders possessing the desired properties are well known in the art and commercially available. Particularly suitable nickel powders may be produced by the process described in Canadian Pat. No. 774,036.

In order to give the slurry a sufficient viscosity, there is dissolved in it a small quantity of one of such organic substances as halogenated gelatins, starch, soluble derivatives of cellulose such as the alkaline or ammonium salts of carboxy methyl celluloses, the hydroxy alkyl celluloses, hydroxy ethyl cellulose and hydroxy propyl cellulose.

The cellulose derivatives in particular used in very small quantities make the slurry highly viscose. In addition, these derivatives act as binders for the slurry. The quantity of organic binder required depends on the type used and the viscosity desired. This quantity varies in general between 1 and 5% by weight of the weight of the liquid, although there is no criticality in the amount. For preparation of porous nickel plates, the viscosity of the slurry should be in the range of 25,000 to 75,000 cps. as measured on a Brookfield viscosimeter. A suspension having a viscosity of less than about 25,000 cps. does not permit the formation of a strip having the desired thickness, porosity and homogeneously dispersed metal particles, while a suspension having a viscosity greater than about 75,000 cps. is not adaptable to sintering.

The quantity of metal powder provided in the slurry depends to a large extent on the density of the powder. Generally, the slurry should contain about 25% to about 75% of the weight of the metal powder. When the metal content is less than about 25%, there is not sufficient contact between the particles to provide a self-supporting metal strip, while metal particles in an amount greater than about 75% generally do not permit the inclusion of sufficient binder to permit the formation of a self-supporting strip.

As noted, carrier 10 coated with layer 18 passes around roller 14 and under slurry dispensing means 19 to drier 24. Metering gate 23 controls the thickness of the slurry and spreads the slurry uniformly over carrier 10. It will be appreciated that the thickness of the slurry can also be varied by, among other means the rate at which the carrier 10 passes dispensing means 19.

Drier 24 evaporates the volatile liquid fraction of slurry layer 18 to prepare it for coining. Drier 24 may be one of a number of devices ordinarily used to evaporate volatile liquids at relatively low temperatures. For example, a heating coil through which superheated steam is passed, infrared radiation, heat lamps and electric resistance heaters are suitable. The use of infrared radiation is preferable in that it ensures a more uniform drying action and more effectively prevents the formation of cracks in the slurry layer 18.

In the embodiments illustrated in FIG. 1, dried slurry layer 18 is subsequently coined as it passes between coining rollers 26 to produce a high density grid pattern and plate outline as shown in FIG. 2. By coining a grid pattern, the plates are strengthened and their electrical conductivity improves. Metallic layer 18 on carrier 10 then passes into sintering furnace 28 which is maintained at a temperature sufficiently high to cause sintering of the powder particles, e.g. between 800° and 1050° C. for nickel powder. The atmosphere in the furnace should be neutral or slightly reducing to prevent oxidation of the metal powder during the sintering of the metal powder particles and volatilization of carrier 10.

The porosity and strength of sintered layer 18 can be varied by alteration of the sintering temperature. The lower the temperature the higher the porosity but the weaker the metallic layer, whereas the higher the temperature the lower the porosity and the greater the strength because of the sintering of the metal particles.

Coined sintered strip may be stored on spool 30 or fed directly to another location for subsequent processing or it may be fed directly to a means for cutting along the coined plate outline to provide a plurality of separate porous plates.

As an alternative to the procedure just described, the coining operation may be carried out on the strip after the sintering operation instead of before as shown in the drawing in which case this operation may also be combined with the cutting of the plates.

It will be understood, of course, that modifications can be made in the embodiment of the invention without departing from the scope and purview of the appended claims.

What I claim as new and desire to protect by Letters Patent of the United States is:

1. A process for making a self-supporting porous electrode plate free of a separate supporting structure or grid comprising the following steps in continuous sequence: applying a layer of slurry of nickel powder, volatile liquid and binder to a flexible carrier strip, said carrier being decomposable at the sintering temperature of said nickel powder and being unreactive with said slurry; evaporating the volatile liquid fraction of said layer of slurry to provide a substantially dry layer of nickel powder and binder on said carrier strip; applying pressure to said dry layer to impress along its length a network of reinforcing lines of substantially lower porosity and higher density than the portions of said impressed layer surrounding said lines; and heating said impressed layer at a temperature sufficient to sinter said nickel powder and volatilize said binder and carrier.

2. A process as claimed in claim 1 wherein said carrier is cellophane.

References Cited
UNITED STATES PATENTS

| | | | |
|---|---|---|---|
| 2,498,873 | 2/1950 | Blue | 29—191.2 |
| 3,627,859 | 12/1971 | Mesite et al. | 264—317 |
| 3,226,263 | 12/1965 | Oswin | 136—120 FC |
| 2,860,175 | 11/1958 | Justi | 136—120 FC |
| 3,186,871 | 6/1965 | Donohue | 136—29 |
| 3,393,096 | 7/1968 | Jost | 136—29 |

ALLEN B. CURTIS, Primary Examiner

C. F. LeFEVOUR, Assistant Examiner

U.S. Cl. X.R.

136—67; 264—316